United States Patent [19]
Hofbauer

[11] 4,343,387
[45] Aug. 10, 1982

[54] DEVICE FOR AUTOMATIC ACTUATION OF AN AUTOMOBILE CLUTCH

[75] Inventor: Peter Hofbauer, Wolfsburg, Fed. Rep. of Germany

[73] Assignee: Volkswagenwerk Aktiengesellschaft, Wolfsburg, Fed. Rep. of Germany

[21] Appl. No.: 123,440

[22] Filed: Feb. 21, 1980

[30] Foreign Application Priority Data

Feb. 21, 1979 [DE] Fed. Rep. of Germany ....... 2906587

[51] Int. Cl.³ .............................................. B60K 41/28
[52] U.S. Cl. ............................ 192/0.076; 192/0.092; 192/3.58; 192/103 C; 74/866
[58] Field of Search ............... 192/0.092, 0.076, 0.075, 192/0.073, 0.07, 0.048, 103 R, 103 C, 103 F, 0.032; 74/866

[56] References Cited
U.S. PATENT DOCUMENTS

| | | | |
|---|---|---|---|
| 3,752,284 | 8/1973 | Brittain | 192/103 F |
| 3,942,393 | 3/1976 | Forster et al. | 192/103 C |
| 4,019,614 | 4/1977 | Prenzel et al. | 192/103 F |
| 4,172,505 | 10/1979 | Rabus et al. | 192/103 C |
| 4,231,092 | 10/1980 | Grob et al. | 74/866 |

*Primary Examiner*—George H. Krizmanich
*Attorney, Agent, or Firm*—Brumbaugh, Graves, Donohue & Raymond

[57] ABSTRACT

A device for automatically actuating a clutch arranged between the output shaft of the engine and the input shaft of a motor vehicle transmission comprises a servo coupled to the clutch for selectively actuating the clutch, a first detection device for measuring the speed of the engine output shaft, a second detection device for measuring the speed of the transmission input shaft, and a control device coupled to the servo means and to the first and second detection devices for controlling the servo as a function of the speeds of the engine shaft and transmission shaft and their second derivatives with respect to time.

10 Claims, 8 Drawing Figures

DEVICE FOR AUTOMATIC ACTUATION OF AN AUTOMOBILE CLUTCH

BACKGROUND OF THE INVENTION

There are presently known devices for automatically actuating a clutch arranged between the engine and transmission of a motor vehicle. Such clutchs may be actuated by a servo motor, for example a pneumatic servo motor. The servo is selectively supplied with either suction to cause the clutch to disengage, or with air at atmospheric pressure to cause the clutch to engage. While there are no particular requirements for disengaging the clutch, for example when the servo disengages the clutch by a supply of suction to the servo motor, the engagement of the clutch by a supply of atmospheric pressure air to the servo motor should be accurate and smooth enough to avoid any undue jolting or jerking of the vehicle.

In one known embodiment of an automatic vehicle clutch, the servo motor is employed only to actuate the clutch when the vehicle is in motion, that is, upon shifting manually from one speed to another. In this process, air is supplied to the servo motor faster or slower depending upon the accelerator position. In order to start the vehicle from a stationary position, however, a separate centrifugal clutch is employed.

SUMMARY OF THE INVENTION

The present invention is a device for automatically actuating a clutch between the engine and transmission by a servo motor, wherein the clutch is actuated automatically but without jerking the vehicle, for the riding comfort of the passenger, both when the vehicle is in motion, for example, while shifting gears, and when the vehicle is started from a stationary position.

More particularly, the present invention is a device for automatically actuating a clutch which is arranged between the output shaft of the engine and the input shaft of the transmission which comprises a servo for selectively actuating the clutch, a first detection device for measuring the speed of the engine output shaft, a second detection device for measuring the speed of the transmission input shaft, and a control apparatus coupled to the servo and to the first and second detection devices for controlling the servo as a function of the speed of the input shaft and transmission shaft and their second derivatives with respect to time.

Due to the fact that the engagement of the clutch is dependent not only upon the engine speed and transmission speed, but also upon the second derivative with respect to time, the jolt occurring while the clutch is being engaged is utilized directly to control the automatic engagement of the clutch and prevent vehicle shock.

In a preferred embodiment of the invention, the control device also regulates the engagement of the clutch to prevent stalling the engine when the vehicle is started.

For a better understanding of the invention, reference is made to the following description of the preferred embodiment, taken in conjunction with the drawings accompanying the application.

DETAILED DESCRIPTION OF A PREFERRED EMBODIMENT

Figure 1:
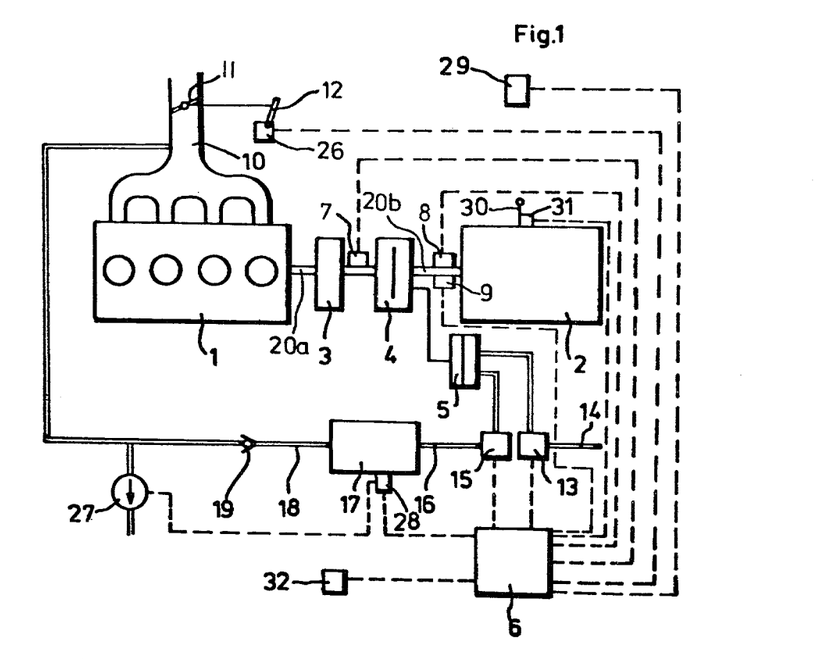
FIG. 1 is a schematic drawing of a clutch control means in accordance with the invention.

A conventional motor vehicle engine 1 is connected to a manual transmission 2 for manually changing the speeds. A flywheel 3 and clutch 4 are arranged in the vehicle power train between the engine 1 and transmission 2. As shown in the drawing, however, the clutch is not, as in conventional vehicles, actuated by a clutch pedal alone, but is engaged and disengaged, alone or together with a pedal actuation, by a servo motor 5, for example, a pneumatic suction servo motor.

The servo motor 5 has two associated valves 13 and 15 connected to the working chamber of the servo motor 5, which are actuated by a control device 6 either to a line 14 communicating with atmospheric pressure or to a line 16 communicating with a source of suction 17. The source of suction 17 may be connected by a line 18 to the intake pipe 10 of the engine 1, with a check valve 19 preferably interposed in the line 18. The suction line 18 is connected to the intake 10 at a point downstream of the throttle 11 (actuated in the normal manner by the accelerator pedal 12) to supply the suction.

The control device 6 emits signals to control the valves 13 and 15 according to the speeds measured before and after the clutch 4. A first speed detection device, speed sensor 7 on shaft 20a, measures the speed of the engine crankshaft 20a, and a second detection device, speed sensor 8 on shaft 20b, measures the speed of the transmission input shaft 20b. Both detection devices are coupled to the control device 6. Another sensor 9 detects the torque on the transmission input shaft 20b. The control device 6 includes apparatus to form the first and second derivatives of the speeds measured by the sensors 7 and 8.

The control device 6 controls the actuation of the clutch in accordance with two different operating modes of the vehicle, namely, initial actuation of the clutch to start the vehicle when it is stationary, and selective engagement when the vehicle is in motion to allow the transmission gears to be shifted. In either case, the control device 6 need only control the engagement of the clutch, since disengagement of the clutch 4 need not be precisely controlled and may be effected by a constant supply of suction to the servo motor 5 over time.

When the vehicle is started, a condition ascertained by measurement of zero or approximately zero speed of the transmission input shaft 20b by the speed sensor 8, the control device maintains the clutch 4 in the disengaged state when the engine speed, as measured by the sensor 7, remains within a preassigned range, that is, below a pre-determined rpm. This speed range may be variable as a function of engine load, that is, as a function of the position of the accelerator pedal 12. Upon reaching the pre-determined speed, the control device 6 causes the servo 5 to begin to engage the clutch 4 to maintain engine speed at (or below) the preassigned value. In the example shown in the drawing, where the clutch 4 disengages when suction from line 16 actuates the servo 5, the control valve 6 causes valve 15 to close and valve 13 to start to open. Partial engagement of the clutch 4 loads the engine and reduces engine rpm increase. The clutch is increasingly engaged to maintain engine rpm below the pre-determined limit.

Overriding this instruction to maintain in a preassigned engine speed, however, the control device 6 governs the servo 5 such that the second derivative of the transmission input speed with respect to time (hence the jerk or jolt occurring during the engagement of the clutch) remains within an acceptable level. If the measured jolt exceeds a pre-determined limit, increasing suction is supplied (by opening valve 15) to the servo to cause the clutch to disengage (slip) temporarily. This insures that there will be no undue jolt causing vehicle shock and impairing the riding comfort of the vehicle when the clutch is engaged automatically. The acceptable jolt level may, of course, be selected according to the type of vehicle.

Finally, the control device 6 may be subject to a third input taking precedence over both of the other two. In accordance with this embodiment, the control device 6 governs the servo 5 such that the speed of the engine output shaft 20a remains above a value at which a danger of engine stall might occur.

More particularly, to start the vehicle, the clutch is governed by a supply of suction or pressure to the servo motor 5 by way of valves 13 and 15, such that starting from a standstill a preassigned starting speed range (of the shaft 20a) is maintained. If a preassigned jolt, defined by the second time derivative of the transmission input speed is exceeded, the control device 6 supplies additional suction to the servo motor 5 by way of valve 15, to partially disengage the clutch 4. Likewise, when the engine output speed decreases to a point where stalling may occur, the clutch is caused to briefly disengage (slip) again until engine rpm increases.

Full engagement of the clutch is effected by the control device 6 when the difference between the speed of the output shaft 20a and the input shaft 20b is less than a preassigned value. This preassigned speed differential may be variable as a function of the rotational speed and/or of the measured engine torque.

To improve further the comfort in the operation during engagement of the clutch, means may be provided to cushion the torque to be applied, for example, by spring systems in the power train.

Figure 2:
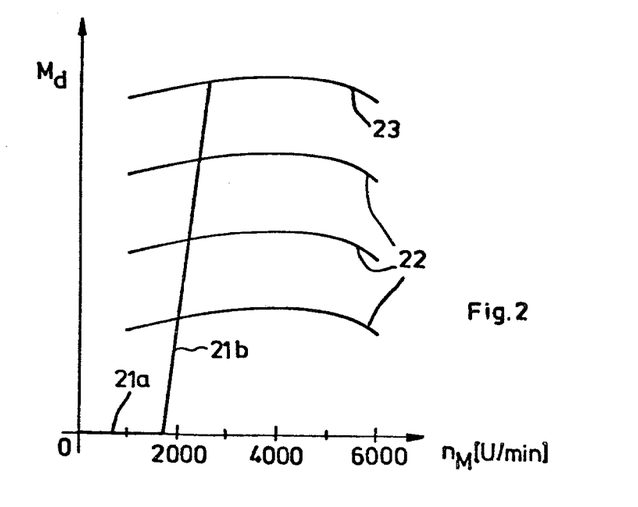
FIG. 2 is a graph illustrating the torque transmitted by the engine clutch as a function of the transmission input shaft speed during engagement of the clutch of a moving vehicle.

Operation of the control device 6 while the vehicle is in motion, for example when changing gears, differs from initial starting of the vehicle. When the vehicle is moving, as detected by the speed sensor 8, the clutch 4 is controlled by the control device 6 such that a certain torque, depending upon the particular engine speed, will be transmitted by the clutch to the transmission. The torque to be transmitted by the clutch to the transmission is a function of the speed on the engine side as indicated, for example, in the graph of FIG. 2. As shown therein, up to a preassigned speed of 1750 rpm, by way of example, the torque transmitted will be approximately zero, as shown by line 21a. With increasing engine speed, the torque transmitted to the transmission increases linearly up to about the maximum engine torque $M_d$ max, as shown by line 21b, and thereafter follows the maximum torque along the full-load torque curve 23 of the engine. In FIG. 2, the numeral 22 designates curves of constant throttle setting.

While in the embodiment of the invention shown, the servo motor 5 disengages the clutch when supplied with suction and causes the clutch to engage when the servo 5 is supplied with air at atmosphere pressure, the actuation of the clutch may be reversed, disengaging when the servo motor 5 is supplied with air and engaging when the servo motor 5 is supplied with suction. In addition, instead of the two valves 13 and 15, a so-called 3-to-2 control valve may be substituted which is responsive to suitable signals from the control device 6 to supply the servo motor 5 either with air by connecting to an atmosphere pressure line or with suction by connecting to a suction line. Moreover, a hydraulic arrangement may be employed.

The signal to start the operation of engaging or disengaging the clutch may also be supplied by the setting of the accelerator pedal, and/or the gear shift lever. Thus, for example, a disengage signal might be emitted when the accelerator pedal is completely released or when the gear shift lever is in neutral, and an engage signal emitted when the accelerator pedal is depressed or the shift lever is moved into one of the gear positions respectively, when such latter signal is emitted, the clutch engages in the manner heretofore described.

The arrangement of FIG. 1 also includes a vacuum pump 27 which is connected to operate in the event the pressure in storage vessel 17 is less than a predetermined vacuum level required to operate the clutch system, as determined by sensing element 28. Sensing element 28 is also connected to control device 6 to provide an indication of low pressure to that device.

A sensor 29 senses the position of the ignition switch, including whether the starter motor is activated, and provides a signal to control device 6 in accordance with the position of the ignition switch. Another sensing element 31 is provided in connection with the manual shift lever 30 in order to provide the control device 6 with an indication of whether a transmission control level has been touched and whether a particular gear is engaged. In a preferred embodiment sensor 31 provides an indication when the lever is in first gear, second gear or reverse gear, since initial starting engagement of the clutch will only be permitted when the transmission is one of these three gears. A hand operated switch 32 is also provided for generating a control signal to control element 6 to prevent automatic clutch disengagement when the accelerator pedal is released, thereby preventing free wheeling.

FIGS. 3A through 3F are flow diagrams illustrating a control program for use in a microprocessor to enable the microprocessor to perform the function of the control device 6. Those skilled in programming can easily write a program in accordance with the microprocessor selected to implement the steps of the flow diagrams contained in FIGS. 3A through 3F.

In the diagrams of FIG. 3, program subroutines are designated by doubly framed blocks, most of which are detailed in subsequent drawings. In FIG. 3A there is shown the main program flow routine, and an auxiliary interrupt program, which is periodically triggered to update measurement of engine shaft rotational speed $N_1$, input transmission shaft speed $N_2$ and input transmission shaft torque $M_d$. The interrupt program has the capability to stop operation of the main program at periodic intervals, and to restart the main program at the point left off, when the measurement subroutines are completed.

Figure 3A:
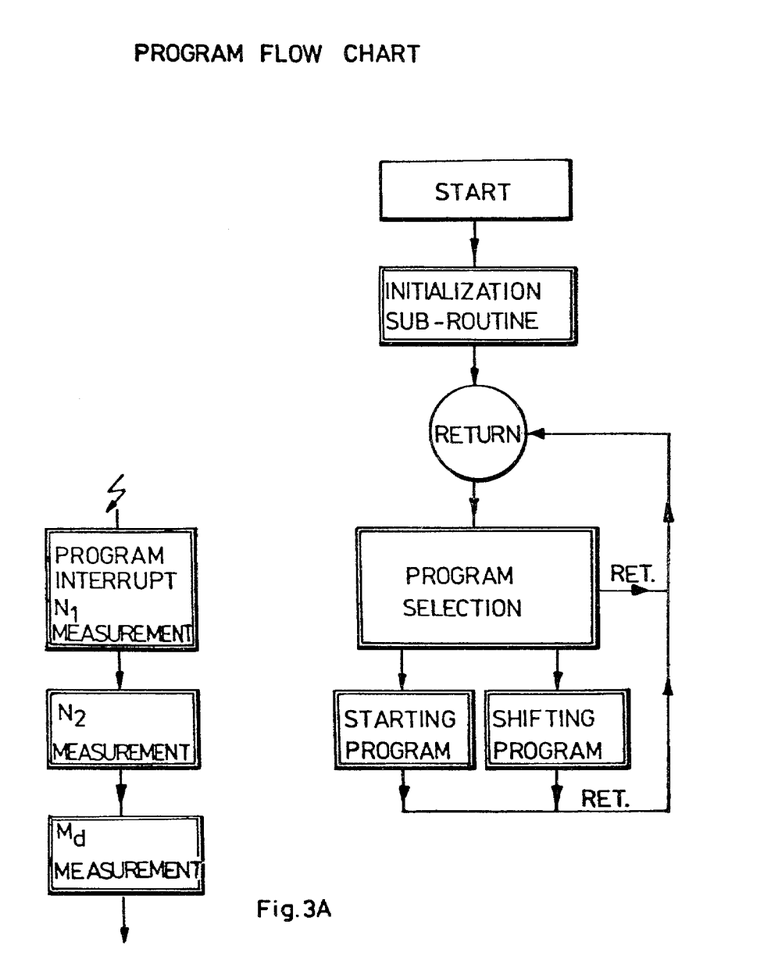
FIGS. 3A through 3F are a program flow diagram for use in the microprocessor control unit of the invention.

The main program illustrated on the right of FIG. 3A includes a program start, an initialization subroutine and a control loop which performs the principal operations of the control device. The initialization subroutine performs the function of setting initial values for program variables when operation is started by the application of power. This subroutine is well known for use in similar devices, and is not material to the scope of the present invention. Therefore the subroutine is not detailed in a flow diagram.

The principal program loop includes a program selection function, which controls the device to operate in either the starting mode or the shifting mode according to which subsequent subroutine is selected. These subroutines are alternately used to provide output control signals to valves 13 and 15. The program selection subroutine and the starting and shifting programs each have steps which cause the return of the logic flow to the start of the program loop. FIGS. 3B through 3F are detailed sketches of the decision logic use in the selection program, the shifting program, the starting program and subroutines contained in those programs. The following symbols are used for the parameters which are material to those programs.

Figure 3B:
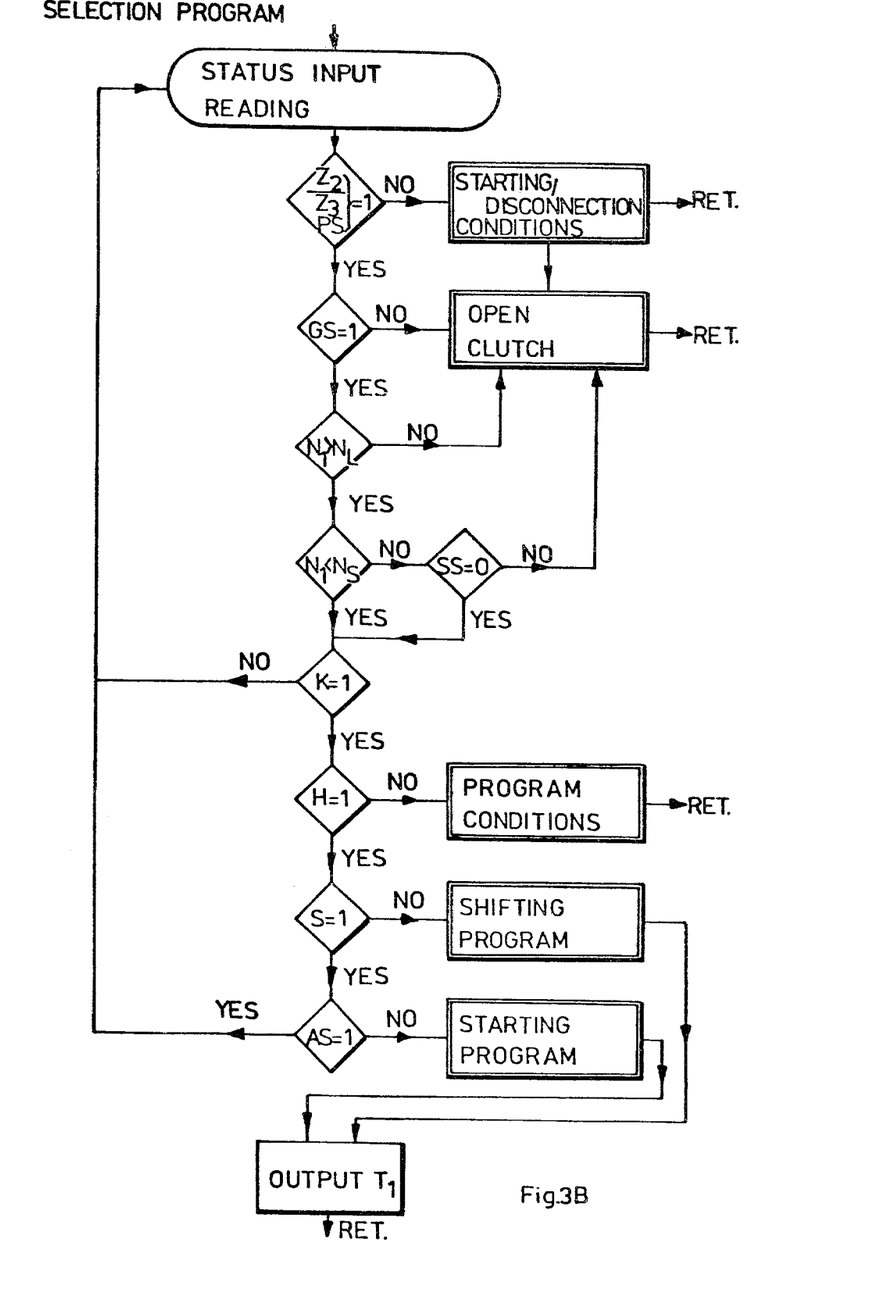

$Z_2 = 1$ the ignition is connected;
$Z_3 = 1$ the starter is *not* actuated;
PS = 1 a given prescribed vacuum is present in the storage;
GS = 1 the gear control lever has not been touched;
$N_L$ a minimum speed below which the clutch must be opened so as not to stall the engine;
$N_S$ the coasting speed which, as a function of the engine speed and the throttle valve angle, occurs when the engine is driven, e.g., on inclines, by the wheels by means of the transmission;
SS = 0 the push-pull switch 32 is in a position in which the automatic disengagement of the clutch while the accelerator pedals is released is prevented;
K = 1 the clutch is partially or fully disengaged;
K = 0 the clutch is fully engaged;
H = 1 the program conditions are set, i.e., the program conditions sub-routine has already been run setting constant H = 1 and also setting constant S = 1 or S = 0, thereby to control the mode of clutch engagement and operate either the starting program or the shifting program;
H = 0 the program conditions have not been set;
AS = 1 the manual control lever 30 is *not* in a position corresponding to the first or second forward gear or the reverse gear;
$T_1$ is a pulse time for acting on the valves 13 or 15 for driving of the clutch control motor 5;
N' is a low speed, e.g., 200 rpm, such that when the vehicle is stopped, the clutch can be engaged without causing a jerk;
$K_1 = 0$ the valve 13 for engagement of the clutch is to be triggered;
$K_1 = 1$ the valve 15 for disengagement of the clutch is to be triggered;
$T_{1z}$ is a fixed pulse time for final locking of the clutch when the vehicle is stopped;
$T_{1A}$ is a fixed pulse time which is sufficient to effect a safe disengagement of the clutch;
$N_G$ limit rotational velocity, e.g., 700 or 900 rpm below which the starting program and above which the gear shift program are to be used;
$\alpha_{DK}$ throttle valve and accelerator pedal angles, respectively;
$\alpha_O$ throttle valve angle associated with cold running state;
ZM is a numerical value representing the number of pulses emitted on clutch engagement from the start of the clutch engaging process on;
ZM = 0 is set when the clutch engagement process starts;
$S_1 = 0$ condition for shifting program;
$S_1 = 1$ condition for the starting program;
$T_{1F}$ first fixed closing pulse which is to be sufficiently long so that the path of free movement of the clutch is overcome;
$N_P$ preassigned engine speed, e.g. 1750 rpm, up to which the torque transmitted will be approximately zero;
$T_{1b}$ fixed pulse time for triggering of the valve 15 (open clutch);
$T_{1D}$ value of pulse time for triggering of the valve 13 which is a function of the torque transmitted;
$T_{1S}$ fixed pulse time which is sufficient for safe (certain) final closing of clutch;
T continuous time which starts to run as the starting program starts;
$T_{Ab}$ time dependent, e.g., upon the engine output, after which the starting program must be discontinued for reasons of safety, e.g., in order to prevent overheating of the clutch;
$N_{2A}$ old value of transmission input shaft speed;
$N_{2N}$ instantaneous value of transmission input shaft speed;
DN difference of speeds;
$DN_A$ old value of speed differential;
$DN_N$ instantaneous value of speed differential;
DDN difference of speed differentials (second time derivative of speed);
X predetermined value of DDN which is fixed stored or depending on throttle angle;
$N_U$ predetermined upper engine starting speed;
$N_L$ predetermined lower engine starting speed;
$T_{1U}$ comparatively long fixed pulse time for triggering the valve 13 (close clutch);
$T_{1L}$ comparatively long fixed pulse time for triggering the valve 15 (open clutch);
$T_{1N}$ normally long fixed pulse time for triggering the valve 13 (close clutch);

The overall arrangement of the program selection subroutine is shown in FIG. 3B. At the start of this subroutine the outputs of the various status sensors, which provide inputs to the microprocessor are sensed, and the corresponding values are stored in appropriate memory locations in the microprocessor circuit. Following this initial input, decisions are made concerning the ignition switch, the starter, the vacuum pressure available. In the event the ignition is off, the starter is being operated or there is insufficient vacuum, the program proceeds to the starting/disconnection conditions subroutine shown at the top of FIG. 3C. Program operation is delayed by return to start if there is insufficient vacuum pressure, the open clutch routine is activated in the event the starter motor is being operated, and, in the final alternative, the clutch is fully engaged if the ignition switch is off and the engine speed is below a minimum value.

Referring again to FIG. 3B, in the event the gear shift lever has been operated or the engine speed is below a minimum idle speed and tending to stall, the open clutch subroutine shown at the bottom of FIG. 3C will be activated. This routine will also be activated if the vehicle engine is being driven by the wheels and the manual control to prevent freewheeling has not been closed.

The next program decision is whether the clutch is opened as determined by the value of K. If the clutch is open, the program proceeds to determine whether H has been set by a previous operation of the program conditions sub-routine. If H=1, one of the clutch engagement programs is operated according to the value of S. Operation of the starting program is prevented if the transmission is not in first, second or reverse gear.

Figure 3C:
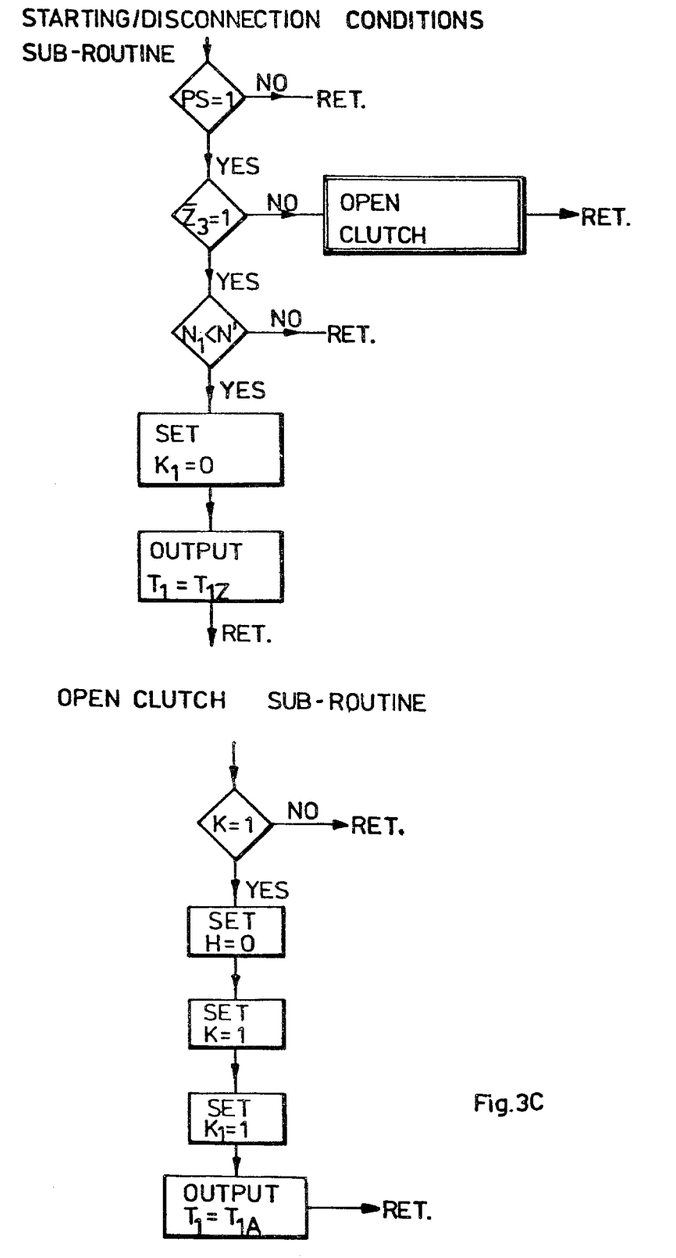
Figure 3D:
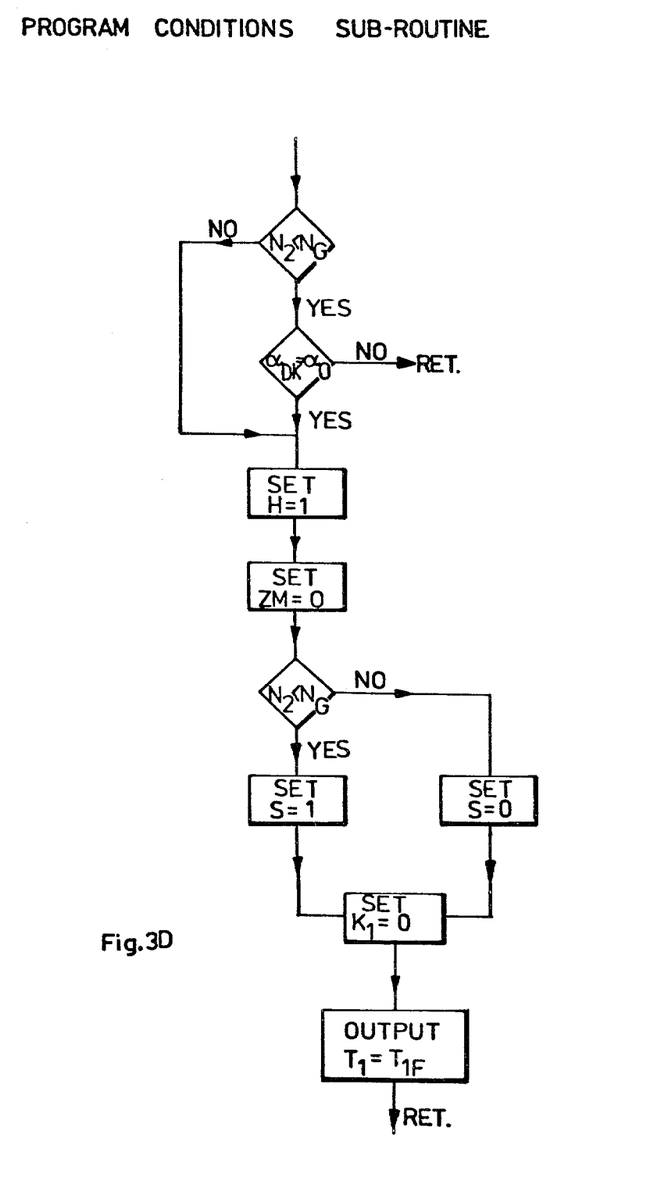

Assuming that the program conditions subroutine has not been operated, i.e. H=0, the program conditions subroutine of FIG. 3D is operated. This routine determines whether the vehicle is operating from a standing, or very slow moving, condition, or being shifted while moving, and sets the value of S accordingly to operate the shifting or starting program according to whether the control device 6 is to operate in the first or second mode. This is determined by the transmission shaft speed N2. This routine also responds to the accelerator position to prevent clutch engagement for a released accelerator when operating in the starting mode and sets the value of H and the program count ZM. This subroutine also provides an output for the initiation of clutch engagement by providing valve 13 with a triggering pulse of sufficient duration to take up the slack in the clutch.

After initial operation of the program condition subroutine, this program is bypassed until the clutch is again opened by the open clutch subroutine in FIG. 3C, which resets H=0.

Figure 3E:
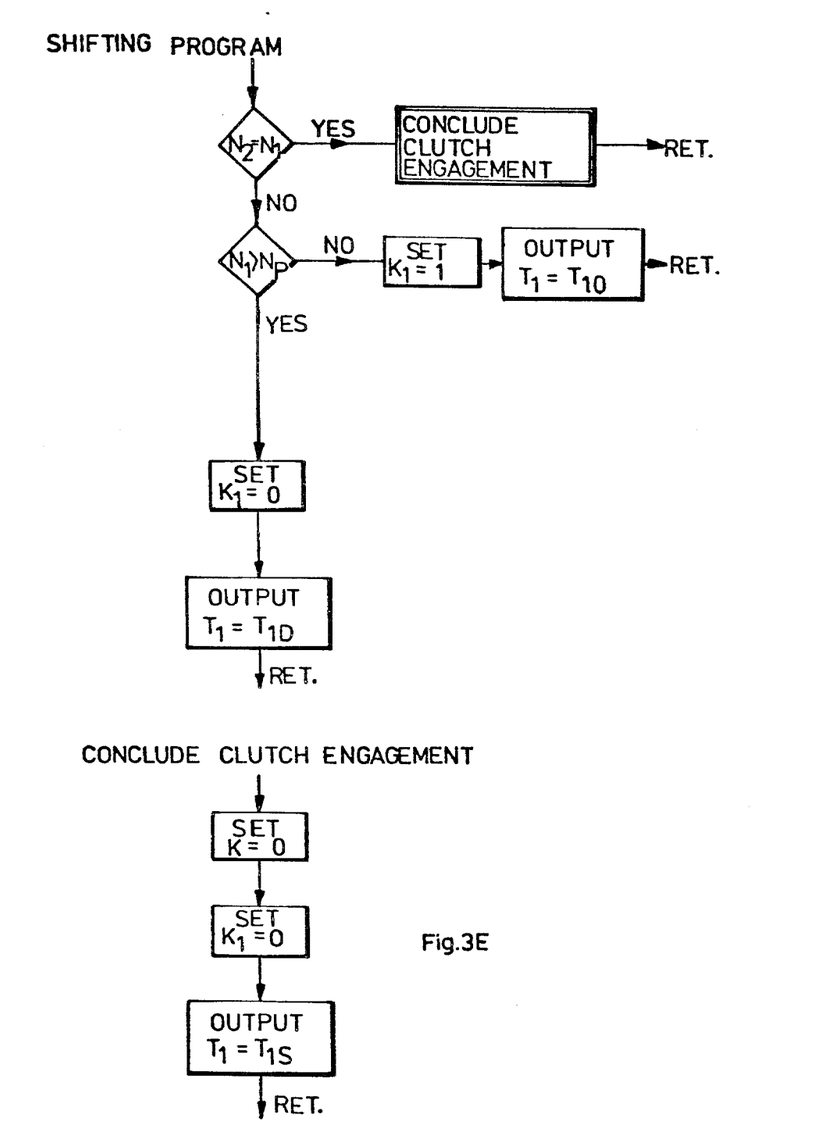

The shifting clutch-engagement program is shown at the top of FIG. 3E. This program includes a speed comparison to determine whether the engine shaft speed reaches a preassigned speed, e.g. 1750 rpm. Up to this engine speed the torque transmitted shall be approximately zero so that the valve 15 is caused to open the clutch. With increasing engine speed, the clutch is closed by triggering the valve 13 with time pulses depending upon the torque transmitted such that a certain torque will be transmitted by the clutch to the transmission.

Figure 3F:
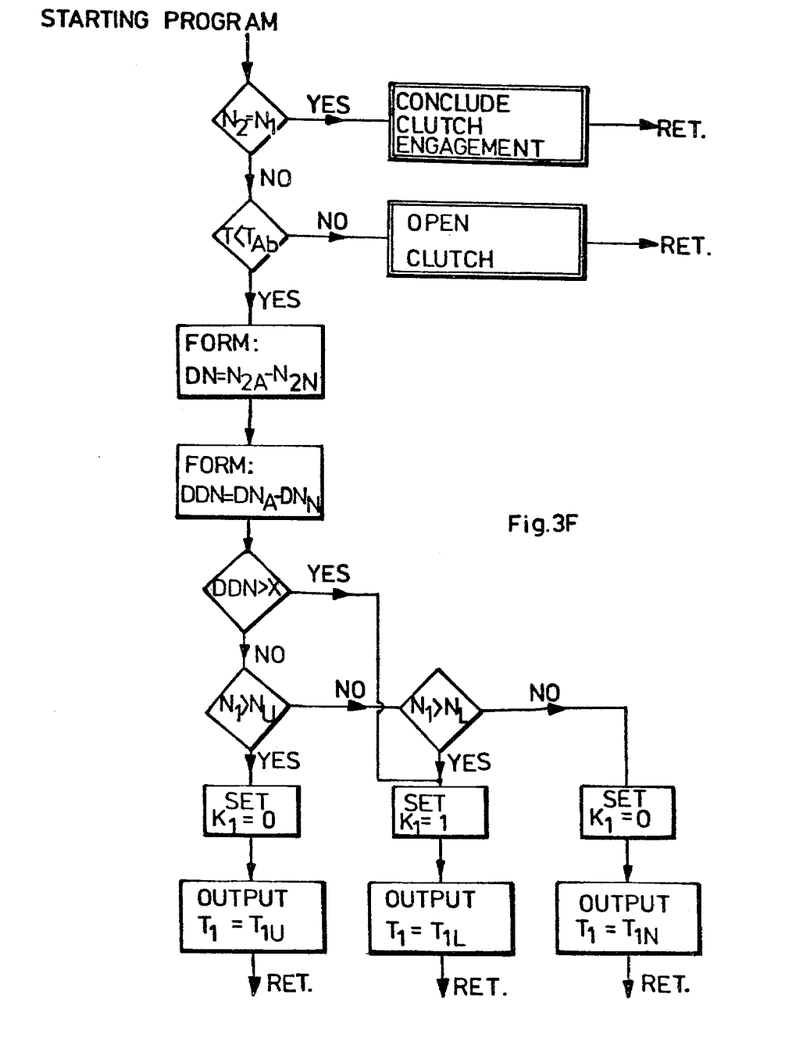

The clutch control program for initial starting is shown in FIG. 3F. This program includes a time comparison to determine whether an overly extended clutch engagement process is taking place, and also includes a comparison of the engine speed and the selected range of starting speeds. According to the engine speed, the clutch is either opened or closed to maintain approximately the desired starting speed range. Overriding this instruction to maintain in a preassigned engine speed range the starting program includes a comparison to determine whether the second derivative of the transmission input shaft speed with respect to time (hence the jerk or jolt occuring during the engagement of the clutch) maintains an acceptable level. To that purpose the program forms a differential value DN which is equivalent to the speed change since the last operation of the routine. The change in this differential speed since the last operation of the routine is then calculated to obtain the time gradient of the speed differential, and this value is used to regulate the engagement of the clutch according to a routine which opens the clutch when the acceptable value of that second derivative of the transmission input shaft speed is exceeded.

Those skilled in the art will recognize that the various steps in the program can be changed or modified to a significant extent while maintaining the general characteristics of the invention. It should be further recognized that other program steps may be included which will perform the various modifications of the control modes in accordance with the invention.

While there have been described what are believed to be the preferred embodiments of the invention, those skilled in the art will recognize that other and further changes may be made thereto without departing from the spirit of the invention, and it is intended to claim all such changes and modifications as fall within the true scope of the invention.

I claim:

1. In a motor vehicle, a device for automatically actuating a clutch arranged between the output shaft of the engine and the input shaft of the transmission comprising servo means coupled to said clutch for selectively actuating said clutch, first detection means for measuring the speed of said engine output shaft, second detection means for measuring the speed of said transmission input shaft, and control means coupled to said servo means and to said first and second detection means for controlling said servo means for actuating said clutch as a function of the speeds of said engine shaft and transmission shaft and their second derivatives with respect to time.

2. A device according to claim 1, wherein said control means is responsive to the detection of substantially zero rpm on said transmission shaft, when said vehicle is started, to actuate said servo means for engaging said clutch to maintain said engine speed within a preassigned range, but wherein said control means is responsive to said detection means for preventing the second time derivative of the transmission input speed from exceeding a preassigned value corresponding to an acceptable jolt.

3. A device according to claim 2, wherein said control means is responsive to said first detection means to cause disengagement of said clutch to prevent said engine speed from decreasing below a speed involving the danger of stalling the engine.

4. A device according to claim 1, wherein said control means is responsive to said second detection means such that when the speed of said transmission input shaft is greater than zero, said vehicle being in motion, the torque transmitted by the clutch between said engine and said transmission is variable as a function of said engine speed.

5. A device according to claim 4, wherein the torque transmitted by said clutch is zero up to a preassigned engine speed, and at greater engine speeds said torque rises linearly to substantially the maximum engine torque reached at full-load curve of the engine.

6. A device according to claim 1, wherein said control means is responsive to said first and second detection means to actuate said servo to fully engage said clutch when the difference between the engine speed and transmission speed is less than a preassigned value.

7. A device according to claim 6, wherein said preassigned value is variable as a function of said engine speed.

8. A device according to claim 6, wherein said preassigned value is the function of said transmission input shaft speed.

9. A device according to claim 7 or 8, wherein said preassigned value is a function of said engine torque.

10. A device according to claim 1, comprising cushioning means arranged in the power train between said engine and said transmission.

* * * * *